UNITED STATES PATENT OFFICE.

MEIJIRO TOGANO, OF TOKYO, JAPAN.

QUICK METHOD FOR BREWING SOY.

1,394,236. Specification of Letters Patent. Patented Oct. 18, 1921.

No Drawing. Application filed February 19, 1920. Serial No. 359,856.

*To all whom it may concern:*

Be it known that I, MEIJIRO TOGANO, a subject of the Emperor of Japan, residing at No. 1686 Sugamomachi, Tokyo Prefecture, Japan, have invented certain new and useful Improvements in Quick Methods for Brewing Soy, of which the following is a specification.

This invention relates to an improved method for brewing soy. In this method, the soy-mash is made from soy-bean koji with the addition of salt water, is maintained at a temperature between 30 to 70 degrees C. for a few days only, so that the albumin contained in the soy-bean is properly decomposed, and afterward Japanese sauce or soy is squeezed out or extracted from the mass. The object of the invention is to facilitate the decomposition of albumin in the soy-bean sufficiently to brew a delicious and tasty soy in a very short period, and consequently to afford a great saving in time and in the cost of installation and working.

The following description sets forth a practical method of the invention given by way of example, from which the special features and advantages thereof may be readily understood. Soy-bean or its cake is first soaked in water for about eight hours and then boiled for about the same length of time. This boiled soy-bean is cooled to a temperature of about 30 degrees C. and then spores of fungi, for instance, *Aspergillus oryzæ* are mixed with it. If desired about 20 per cent. of wheat or other grain may be added to this mixture. The mixture is kept three days in a warm damp chamber at a termperature of about 30 degrees C. During the latter period, the soy-bean becomes covered with soft greenish-yellow mycelium, produced by germination and development of the spores of the *Aspergillus oryzæ*. The koji may be hereinafter called "soy-bean-koji," for convenience of description, regardless of whether grain was or was not made part of the mixture when the spores of fungi were added. To this soy-bean koji is added an equal volume of salt-water having a gravity of about 20 degrees Baumé, and a temperature preferably of about 60 degrees C. Then the mixture of soy-mash is maintained at a temperature of from 30 to 70 degrees C., and it is stirred by any convenient means, one to three times a day.

The albumin of the soy-bean, by the foregoing treatment, is properly decomposed in a period of less than ten days from the time the salt-water was added to the soy-bean-koji, and the soy-mash will produce the peculiar flavor of soy. Therefore, after the albumin is decomposed, soy is squeezed out or extracted from the soy-mash and the product thus produced is heated by means employed in the ordinary process, for the purpose of preparing the soy for use and sale.

For the purpose of pointing out the advantages of the present invention, I will compare the same with the method now generally used in brewing soy. The ordinary process consists in preparing a mixture of a certain volume of boiled soy-bean and a substantially equal volume of the powder or roasted wheat and from this mixture the koji is made. To this koji, salt-water of about 20 degrees Baumé is added, and this salted koji or soy-mash is either exposed to atmospheric temperature and stirred at intervals, or it is heated below the temperature of 30 degrees C., to accelerate the germination of the yeast.

With the known process, as the koji is made from a certain quantity of soy-bean mixed with a comparatively large volume of other materials, is salted in comparatively high concentration and is exposed in atmospheric temperature the temperature of the soy-mash, does not exceed 28 degrees C. even in midsummer. Accordingly it follows that the decomposition of the albumin, by the aid of the enzyms of koji, which is of the greatest importance in soy brewing, is very slow on account of the lack of heat and the application of comparatively concentrated salt-water, to the koji. Therefore the albumin will be hardly decomposed even after a year or more. Consequently the majority of the soy-bean will be lost by decomposition, and as a result, the known process is uneconomical and has disadvantages which render the same objectionable.

I have investigated the decomposition of albumin and as a result I am enabled to overcome the disadvantages in the known process. According to my invention, from boiled soy-bean with or without the addition of a small quantity of grain, the so-called soy-bean-koji is made, and the latter is salted in salt-water of about 20 degrees Baumé. This mixture is maintained at a temperature of from 30 to 70 degrees C., by which temperature the decomposition of the albumin is finished in about ten days. From the mash a delicious and tasty soy is produced and this soy may be obtained in a short time, whereas the known method of soy brewing requires one year or more to complete the fermentation.

It is obvious that the soy produced by my method may be concentrated by evaporation or the like in order to reduce the same to solid form.

Having now particuarly described and ascertained the nature of the invention and in what manner the same is to be performed, I declare that what I claim is:—

1. A rapid method of soy brewing consisting in salting soy-bean-koji with salt water of about 20 degrees Baumé, maintaining this mixture at a temperature of approximately 40 degrees C. in order to decompose the albumin, and extracting the soy from said mixture.

2. A method of soy brewing consisting in maintaining a soy-mash at a temperature above 30 degrees C. and below 70 degrees C. for a period of time sufficient to decompose the albumin of the soy-bean.

3. A method of soy brewing, consisting in boiling the soy-bean, salting the soy-bean with salt-water of about 20 degrees Baumé, maintaining the mixture at a temperature above 30 degrees C. for a length of time sufficient to decompose the albumin of the soy-bean, and extracting soy from said mixture.

4. A method of the kind defined by claim 3 in which another grain is added to the soy-bean before the same is salted.

5. A rapid method for producing soy, consisting in forming a soy-mash from soy-bean-koji with the addition of salted water, maintaining said mash at a temperature above 30 degrees C. for a length of time sufficient to decompose the albumin of the soy-bean, and finally extracting soy from said mash.

In testimony whereof he affixes his signature in the presence of two witnesses.

MEIJIRO TOGANO.

Witnesses:
GEUJI KULIBARA,
C. ARCILLAS.